US006027171A

United States Patent [19]
Partington et al.

[11] Patent Number: 6,027,171
[45] Date of Patent: Feb. 22, 2000

[54] AUTOMOTIVE MODULAR SEAT FRAME ASSEMBLY

[75] Inventors: Eric Partington, Troy; John Slaven, Harper Woods; James Masters, Farmington Hills, all of Mich.

[73] Assignee: Lear Corporation, Southfield, Mich.

[21] Appl. No.: 09/027,280

[22] Filed: Feb. 20, 1998

Related U.S. Application Data

[63] Continuation-in-part of application No. 08/705,513, Aug. 29, 1996, abandoned.
[60] Provisional application No. 60/007,548, Nov. 27, 1995, and provisional application No. 60/016,775, May 7, 1996.

[51] Int. Cl.[7] .................................................. A47C 7/18
[52] U.S. Cl. .............................. 297/452.18; 297/452.22; 297/452.23; 297/452.33; 297/452.35; 297/452.53; 297/452.55; 297/452.59; 297/452.65; 297/284.1; 297/284.6; 297/284.9
[58] Field of Search ..................... 297/452.18, 452.65, 297/284.1, 284.4, 284.6, 284.9, 452.23, 452.55, 452.58, 452.59, 452.29, 452.3, 452.31, 452.32, 452.33, 452.34, 452.35, 452.36, 452.38, 452.4, 452.22

[56] References Cited

U.S. PATENT DOCUMENTS

| | | |
|---|---|---|
| 3,623,768 | 11/1971 | Capener et al. . |
| 4,390,210 | 6/1983 | Wisniewski et al. . |
| 4,500,136 | 2/1985 | Murphy et al. ........................ 297/284.9 |
| 4,509,796 | 4/1985 | Takagi ................................. 297/452.55 |
| 4,536,030 | 8/1985 | Sakurada et al. ..................... 297/284.9 |
| 4,589,695 | 5/1986 | Isono ................................. 297/284.6 X |
| 4,592,588 | 6/1986 | Isono et al. ............................ 297/284.6 |
| 4,636,000 | 1/1987 | Nishino ................................ 297/284.9 |
| 4,707,027 | 11/1987 | Horvath ................................ 297/284.6 |
| 4,861,104 | 8/1989 | Malak .............................. 297/452.59 X |
| 4,867,507 | 9/1989 | Arai ................................ 297/452.59 X |
| 4,871,209 | 10/1989 | Handelman ...................... 297/452.53 X |
| 4,883,320 | 11/1989 | Izumida et al. ................... 297/284.1 X |
| 5,016,941 | 5/1991 | Yokota . |
| 5,022,709 | 6/1991 | Marchino ......................... 297/284.1 X |
| 5,029,942 | 7/1991 | Rink ................................... 297/452.18 |
| 5,280,997 | 1/1994 | Andres et al. .................... 297/284.6 X |
| 5,288,134 | 2/1994 | Hewko et al. ................. 297/452.18 X |
| 5,328,248 | 7/1994 | Nishiyama .................... 297/452.18 X |
| 5,364,167 | 11/1994 | Aoki et al. ........................ 297/452.18 |
| 5,403,067 | 4/1995 | Rajaratnam . |
| 5,425,569 | 6/1995 | Hayes ................................. 297/452.35 |
| 5,441,331 | 8/1995 | Vento ................................. 297/452.33 |
| 5,516,195 | 5/1996 | Canteleux ............................ 297/284.1 |
| 5,522,645 | 6/1996 | Dahlbacka ........................ 297/452.55 |
| 5,544,942 | 8/1996 | Vu Khac et al. ................. 297/452.37 |
| 5,697,670 | 12/1997 | Husted ........................... 297/452.18 X |

Primary Examiner—Peter M. Cuomo
Assistant Examiner—Rodney B. White
Attorney, Agent, or Firm—MacMillan, Sobanski & Todd, LLC

[57] ABSTRACT

An automotive seat assembly which comprises a seat cushion, a seat back portion having a pair of spaced apart upright members each having upper and lower ends, and a cross member extending between the upper ends. A support member having front and back surfaces, a pair of spaced apart upright bolsters which are each pivotally connected to the support member, and two pairs of spaced apart walls defining two channels therebetween are disposed on the back surface of the support member and on each of the bolsters. The region of the back surface between each pair of walls serves as a hinge about which the bolsters pivot in order to facilitate the movement of the bolsters with respect to the remainder of the support member.

22 Claims, 9 Drawing Sheets

AUTOMOTIVE MODULAR SEAT FRAME ASSEMBLY

RELATED APPLICATIONS

This application is a continuation-in-part of U.S. Ser. No. 08/705,513 which was filed on Aug. 29, 1996, abandoned, which in turn claims priority to U.S. Provisional Application Ser. No. 60/007,548, filed Nov. 27, 1995, and U.S. Provisional Application Ser. No. 60/016,775, filed on May 7, 1996.

BACKGROUND OF THE INVENTION

This invention relates in general to automotive seat assemblies and, more specifically, to an automotive front seat assembly.

Lateral bolsters incorporated into vehicular seats have grown in popularity since they contribute significantly to both the comfort and safety of the vehicle occupants. In order to accommodate occupants having varied effective widths and in order to obtain the proper lateral separation between the occupant and the lateral bolster for imparting the greatest protective ability of the bolsters, vehicular seats have been constructed so that the effective distance between the bolster sections are made variable and adjustable to provide the proper support and comfort for the particular Occupant of the vehicle seat. One known method for adjusting the bolsters is to adjust the lateral position of each bolster section by a hand wheel which, upon rotation, causes the associated bolster section to move relative to its associated backrest portion. In this manner, the distance between the adjusted bolster section and the bolster section mounted at the opposite side of the backrest portion can be varied. The other bolster section may be individually adjusted by its own handwheel in a similar fashion.

Such a method for varying the distance between a pair of corresponding bolster sections is not only complicated but also time-consuming in that each of the 10 bolster sections must be individually adjusted to obtain the proper distance therebetween.

Another known method for variably adjusting the lateral position of each bolster section provides a pair of movable lateral bolster sections wherein adjustment means are provided for selectively and simultaneously moving both of the bolster sections in a controlled fashion between a first lateral support position and a second lateral support position.

Yet another known method utilizes a backrest containing a spring core which has forwardly curved lateral side supports which form the lateral bolsters. In order to adjust the lateral bolsters, the spring core is deformed as a whole by inflation of air cushions to increase or decrease the amount of curvature of the lateral side supports.

However, it would be advantageous to have a design which is fabricated of a minimum of components which are universally used in seats from model to model which retains the ability to individually adjust the bolsters while minimizing the complexity and number of moving parts required to do so.

Typically, each of the components comprising seat assemblies for a vehicle must be independently mounted into the vehicle, that is to the vehicle floor pan. More specifically, the seat bottom and scat back are mounted to a pair of tracks which must then be mounted to the vehicle floor pan for each individual scat assembly—Additionally, the front scat assemblies for automobiles are typically designed for each specific model of automobile and are typically only usable in that model. The seat assembly for each model is fabricated from components specifically designed for that particular scat assembly and the seat assemblies for opposite sides of the vehicle frequently differ, sometimes requiring the two seats to be installed in the vehicle in separate operations.

The parent application for the present application discloses a scat frame assembly for a vehicle which includes a minimum of components which may be utilized in seats for various different models of vehicles. In furtherance of the trend toward minimizing components which are used in seats from model to model, and in furtherance of the trend towards the use of universal seat components which can be used in seats from model to model, it would be advantageous to have a vehicle seat assembly in which components such as the scat portion of a vehicle seat assembly can be designed in a modular fashion to be utilized in combination with a universal seat support and frame assembly. Additionally, in traditional seat construction, a contoured foam pad which is used to give shape and provide comfort to the seat assembly is molded prior to assembly of the seat portion. However, it would be further advantageous to have a vehicle seat assembly in which the necessity for pre-molding of the foam pad is eliminated.

The trend towards making vehicle seat assemblies more universal and/or modular utilizing a basic or universal seat frame assembly and then to attach the desired support or cushion members thereto touches all aspects of the seat assembly. Since the basic or universal seat frame assembly must be small enough to fit into the smallest model car, when the basic or universal seat frame assembly is utilized in a larger car, it may be necessary for the support or cushion members to have a dimension which exceeds the boundaries of the underlying frame assembly which can cause the support or cushion members to deform under load at points which are not directly supported by the underlying seat frame assembly. Accordingly, it would be advantageous to have a vehicle seat back and seat bottom support which is constructed in such a way so as to maintain its ability to accommodate different sized seat backs or seat bottoms without becoming deformed under load when used in combination with the basic or universal seat frame assembly. Additionally, it would be advantageous to have a simplified method for constructing such a support member of cushion.

SUMMARY OF THE INVENTION

This invention relates to a vehicle seat assembly comprising a seat cushion, a seat back portion having a pair of spaced apart upright members each having upper and lower ends, and a cross member extending between the upper ends. A support member having front and back surfaces, a pair of spaced apart upright bolsters each pivotally connected to the support member for allowing for adjustment of the position of the bolsters. Two pairs of spaced apart walls defining two channels therebetween disposed on the back surface of the support members and on each of the bolsters. The region of the back surface between each pair of walls serves as a hinge portion, the bolsters being pivotal about the hinge.

Also, according to the present invention there is disclosed a vehicle seat assembly comprising a seat frame, a seat pan supporting the seat frame, a resilient contoured support member supported by the seat pan having top and bottom surfaces and including two sides extending fore and aft and being laterally spaced apart from one another. A cross beam interconnects the two sides and the two sides and the cross beam define an opening therebetween for exposing a portion of the seat pan. A pad comprising an expanded material is disposed between the support member and a seat bottom trim cover.

Also according to the present invention there is provided a Vehicle seat back assembly and a Vehicle seat bottom assembly which comprises a seat frame and a support member secured to the seat frame and encapsulated by a trim cover. The support comprises a rigid inner layer, an expanded polymer layer disposed thereover, and an elastomeric outer layer disposed about the expanded polymer layer.

Additionally, according to the present invention, there is disclosed a method of making a scat back and/or a seat bottom comprising the steps of applying a layer of elastomeric material to closed mold halves, applying a layer of expanded polymeric material to the layer of the elastomeric material, and then disposing a molten parison of a non-expanded polymeric material which becomes rigid upon cooling into the closed mold halves and blow molding the non-expanded polymeric material to form the seat back or the scat bottom.

Accordingly, the subject invention provides seat components which may be utilized in seats for various different models of vehicles which have greater adaptability to various different models of vehicles, have increased strength, and which eliminates both the number of parts and number of steps required in the manufacture and assembly of the seat assemblies.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
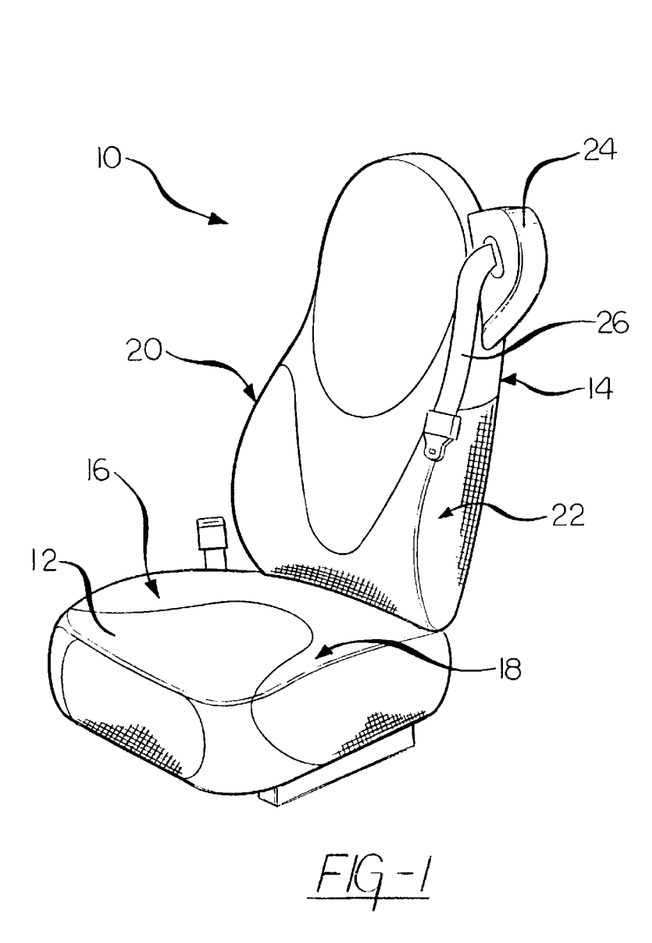
FIG. 1 is a perspective view of a seat assembly of the subject invention.

Referring now to the drawings, there is illustrated in FIG. 1 a front seat assembly is generally shown at 10. The assembly 10 is to be installed as a unit in a vehicle in front of a rear seat assembly.

The seat assembly 10 includes a seating portion 12 and an interconnected backrest portion 14. A pair of movable lateral bolster sections comprising a right-hand bolster section 16 and a left-hand bolster section 18 are mounted on opposite sides of the seating portion 12 and project above the top part of the seating portion 12 to laterally support the lower part of an occupant of the seat assembly 10 therebetween.

A second pair of movable lateral bolster sections comprising a right-handed bolster section 20 and a left-hand bolster section 22 are mounted on opposite sides of the backrest portion 14 and project towards the front of the vehicle seat assembly 10 to laterally support the upper part of the occupant of the vehicle seat assembly 10 therebetween. A seat belt housing 24 for retaining a seat belt 26 therein is disposed on the seat assembly 10.

Figure 2:
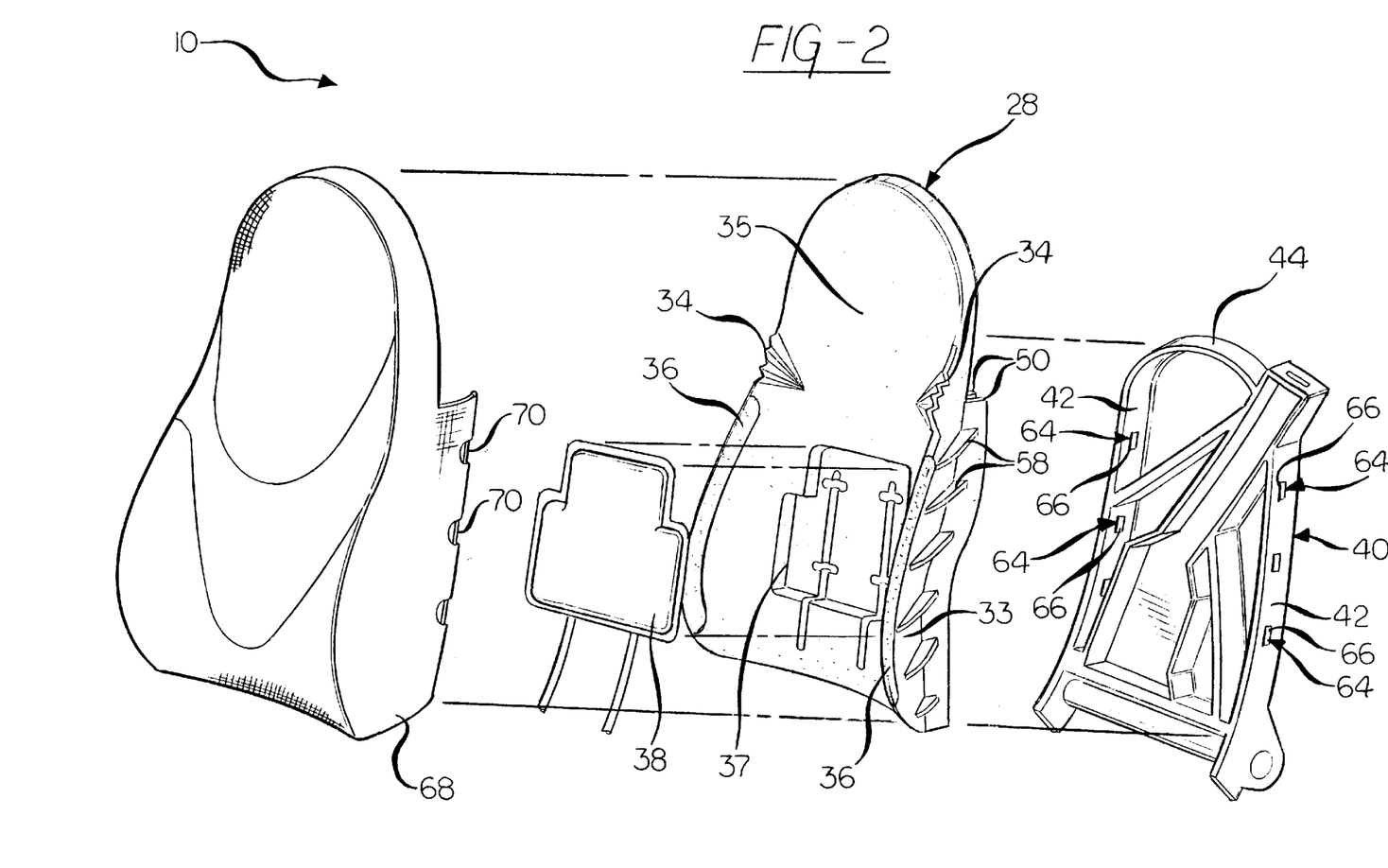
FIG. 2 is an exploded perspective view of the seat assembly of the subject invention.
Figure 3:
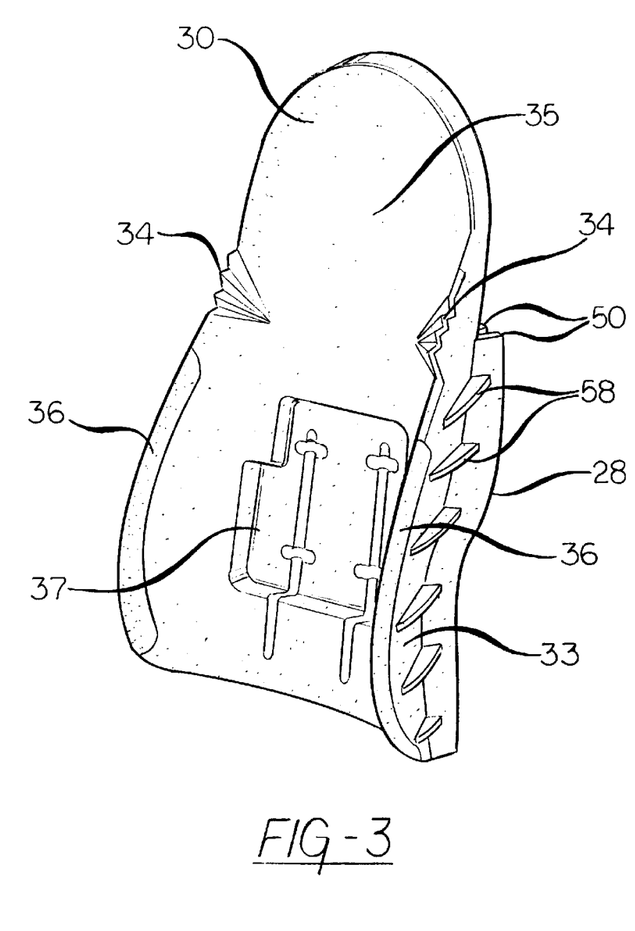
FIG. 3 is a front perspective view of the support member of the subject invention.
Figure 4:
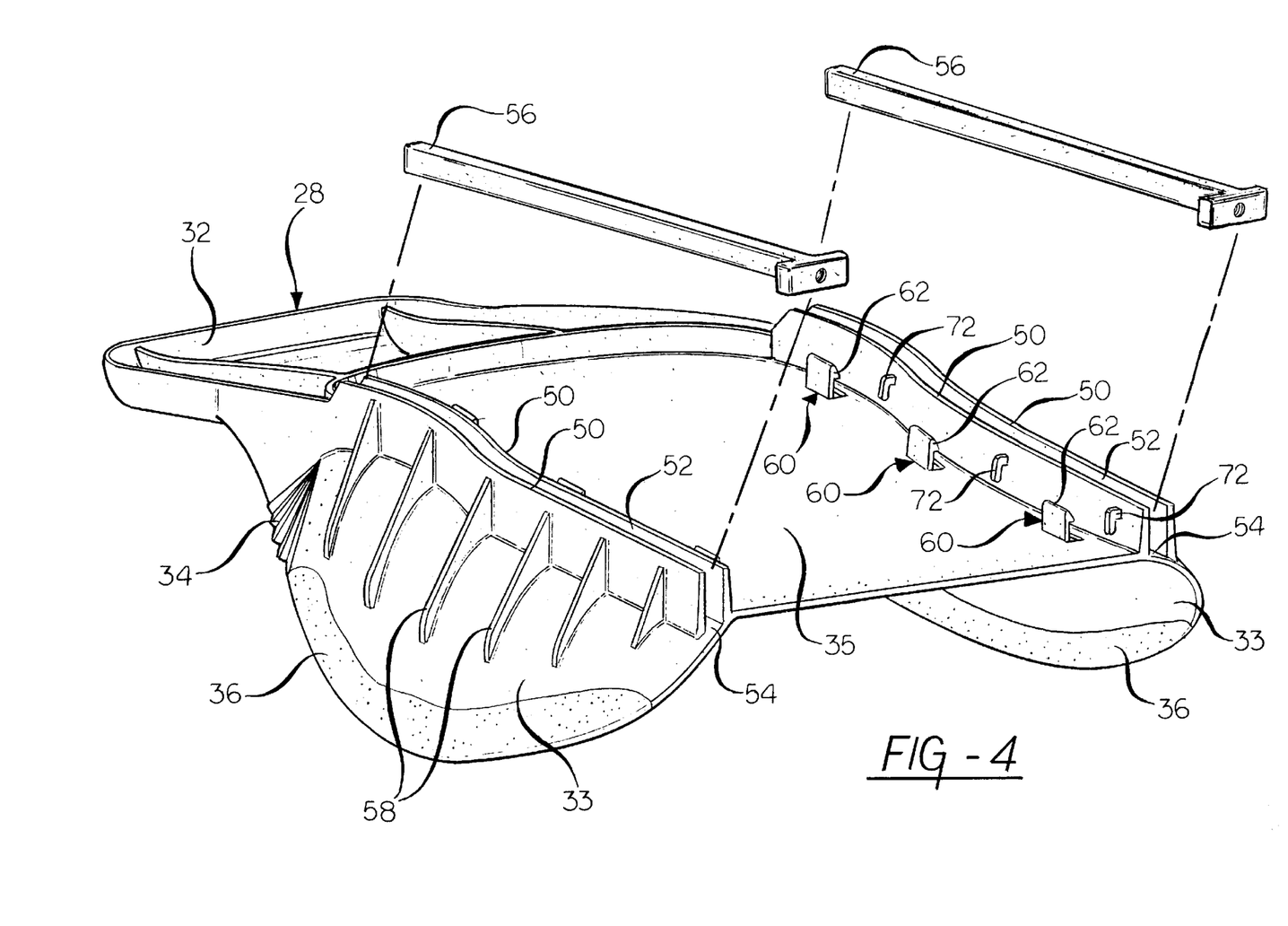
FIG. 4 is an exploded rear perspective view of the support member of the subject invention.

With reference to FIGS. 2, 3, and 4, the seat assembly 10 includes a support member 28 which is affixed a seat frame assembly 40. The support member 28 is formed as a unitary member having a planar back member 35 and a pair of spaced apart upright bolster members 33 mounted on opposite sides of the planar back member 35. A pair of bellows 34 are disposed above each bolster member 33 for allowing movement of the bolster members 33 relative to the support member 28. A resilient strip 36 is disposed on each bolster member 33 and provides a softer feel to the seat assembly as the sharpness of the edge of the bolster member 33 is reduced by the resilience of the resilient member 36. The resilient member 36 can be constructed of any suitable material such as SANIPRENE®.

A recess 37 is disposed within the support member 28 for receiving and retaining a lumbar adjustment bladder 38 therein. The lumbar bladder 38 is disposed between the support member 28 and a trim cover 68 for extending and contracting the trim cover 68 relative to the support member 28.

Figure 5:
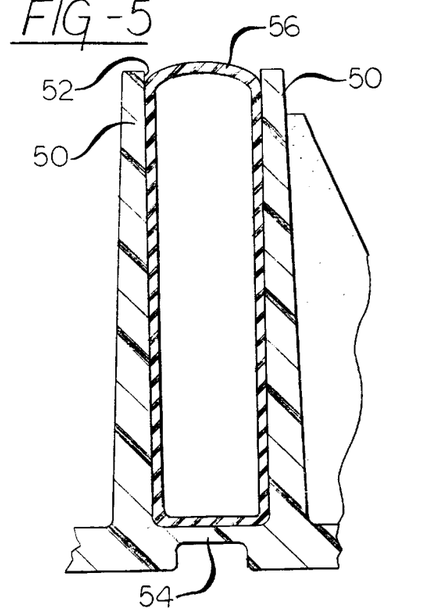
FIG. 5 is a cross-sectional view of a hinge portion of the subject invention.

The support member 28 includes two pairs of spaced apart walls 50 which define two channels 52 therebetween. The walls 50 are disposed on the back surface 32 of the support member 38 and on each of the bolsters 33. Preferably, the walls 50 are disposed substantially parallel to one another. The region of the back surface 32 between each pair of the walls 50 serves as a hinge 54 about which the bolsters 33 are able to pivot. More specifically, the hinge 54 is an integral flexible region disposed between each of the pairs of the spaced apart walls 50. This type of hinge is commonly referred to in the art as a "living hinge."

A plurality of reinforcing ribs 58 are affixed to each bolster member 33 and to one of the walls 50. The reinforcing ribs 58 are affixed at one end to each outmost disposed wall 50 and at its other end to each bolster member 33. A bladder 56 is preferably disposed in each channel 52. The bladder 56 is used to actuate the movement of the bolster member 33 with respect to the planar back member 35. More specifically, when the bladder 56 is disposed in the channels 52 in an unexpanded condition, the bolster members 33 are each disposed at the maximum distance from each other.

However, upon expansion of the bladder 56, the bladder 56 causes the walls 50 to move away from each other thereby causing pivotal movement of each bolster member 33 about the hinge 54 bringing the bolster members 33 into closer proximity to each other. That is, upon expansion of each bladder 56, the wall 50 having the plurality of rib members 58 affixed thereto is cause to move away from the other wall 50 defining the channel in which the bladder 56 is disposed. The force applied to the wall 50 having the rib members 58 affixed thereto is transferred through the rib members 58 to the bolster member 33 thereby causing the bolster member to pivot inwardly about the hinge 54. In addition to disposing a bladder 56 in each channel 52, a shunt (not shown) which can be designed in various embodiments and of materials possessing various characteristics can be disposed in the channel 52 to alter the characteristics of the bolster member 33. That is, by changing the geometry or physical properties of the shunt, the stiffness and/or prominence of the bolsters 33 can be adjusted. For example, a wedge can be placed into each channel 52 to cause the bolster members 33 to pivot about the hinge 54.

Figure 7:
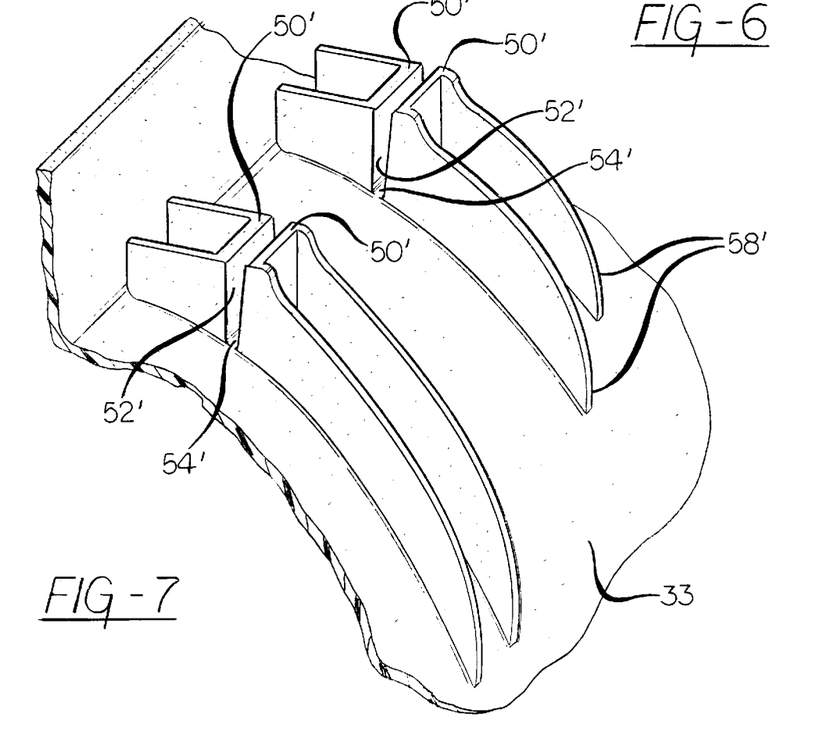
FIG. 7 is a perspective view, partially in cross-section, of an alternative embodiment of the support member of the subject invention.

As best shown in FIG. 4, the pairs of spaced apart walls 50 defining the channels 52 therebetween are disposed substantially parallel to each other. Additionally, the pairs of walls can continuously extend the length of each bolster member 33. Alternatively, as shown in FIG. 7, the wall members 50' can be disposed in a discontinuous fashion along the back surface 32 of the support member 28 and bolster member 33. More specifically, each pair of walls 50' is terminated at their ends such that a plurality of discrete channels 52 are formed. Each discrete pair of walls 50' is terminated at its ends by a rib 58' thereby defining a hinge 54' between each discrete pair of walls 50'. As discussed above, an actuating device such as a bladder can be disposed within the charmers 54' to cause the bolster member 33 to pivot about the hinge 54'.

The support member 28 can be constructed of any suitable material. Preferably, the support member 28 is constructed of a polymeric material such as polypropylene, nylon or polyethylene.

Figure 6:
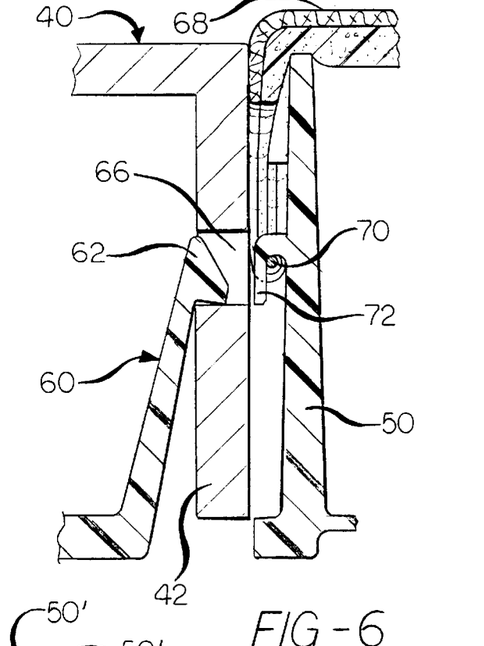
FIG. 6 is a cross-sectional view of the mechanism for retaining the support member and trim cover of the subject invention.

Referring to FIG. 2, the seat assembly 10 includes a seat back frame 40 having a pair of spaced apart upright members 42 each having upper and lower ends and a cross member 44 extending between the upper ends of the seat back frame 40. Each upright member 42 includes a plurality of female fasteners 64 for receiving and retaining male fasteners 60 disposed on the back surface 32 of the support member 28. The female fasteners are preferably apertures 66. Referring specifically to FIGS. 4 and 6, the male fasteners 60 are preferably resilient detents 62 which extend perpendicularly from the back surface 32 of the support member 28. The detents 62 are received and retained within the apertures 66 of the seat back frame 40 to lockingly retain the support member 28 to the seat back frame 40.

The trim cover component 68 is disposed over the support member 28. The trim cover 68 includes an attachment member 70 which allows the trim cover 68 to be received and retained by a plurality of hooks 72 disposed on each of the innermost walls 50 disposed on the support member 28. As is best shown in FIG. 6, the attachment member 70 is preferably a rod disposed at the periphery of the trim cover 68 which is retained within the hooks 72 disposed on the innermost walls 50.

Figure 8:
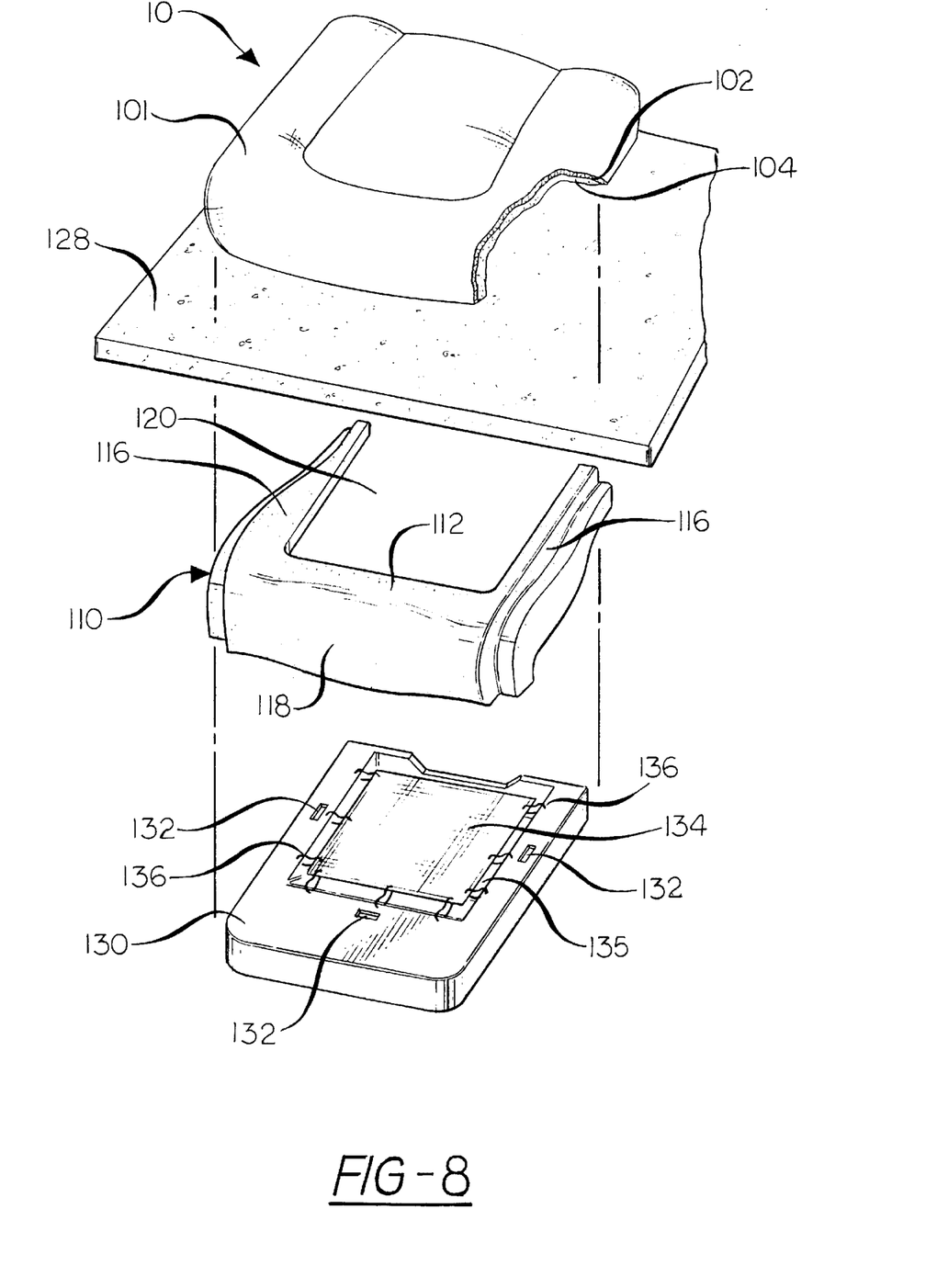
FIG. 8 is an exploded perspective view of a vehicle seat bottom assembly of the subject assembly.
Figure 9:
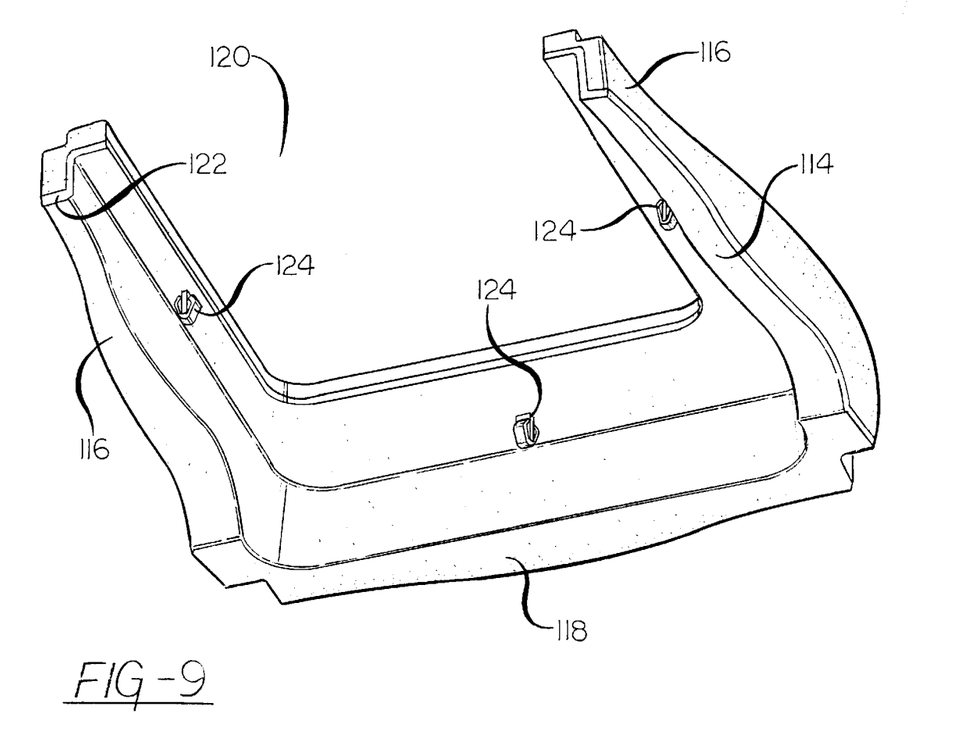
FIG. 9 is a bottom perspective view of a resilient contoured support member of the subject invention.
Figure 10:
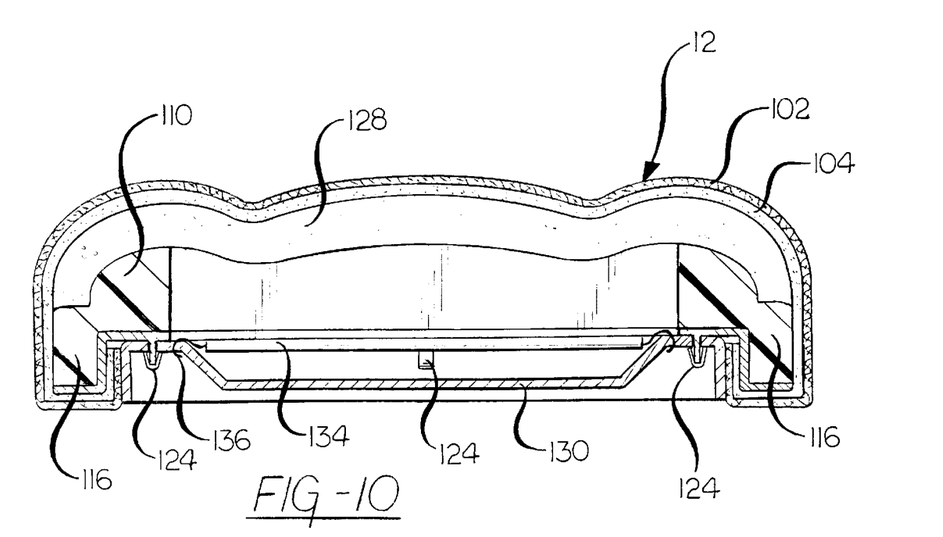
FIG. 10 is a cross-sectional view of the unexploded assembly shown in FIG. 8.

Referring to FIGS. 8, 9, and 10, a vehicle seat bottom assembly is generally shown at 100.

The seat bottom assembly 100 includes a seat bottom trim component 101 which is comprised of an upholstered layer 102 and a foam scrim layer 104. A resilient contoured support member 110 is supported by a seat pan 130 and includes a top surface 112 and a bottom surface 114. The support member 110 is comprised of two side members 116 extending fore and aft which are laterally spaced apart from one another and are interconnected by a cross beam 118. The side members 116 are interconnected with the cross beam 118 to define an opening 120 for exposing a portion of the seat pan 130.

The support member 110 is preferably constructed of an expanded polymeric material such as expanded polypropylene. The expanded material preferably has some structural rigidity to maintain the shape of the support member 110 and provide support to the occupant of the seat bottom assembly 100.

A resilient pad 128 preferably comprising an expanded polyurethane material having uniform thickness is disposed between the trim cover 101 and the support member 110. The pad 128 conforms to the shape of the support member 110 when the trim component 101 is disposed therein.

As best shown in FIG. 9, the bottom surface 114 of the support member 110 is skinned with a layer 122 of a non-expanded, rigid material. Specifically, the skinned layer 122 is a remelted expanded polypropylene which converts the expanded polypropylene to a non-expanded form. This type of skinning is well known in the art and is typically accomplished by reheating the bottom surface 114 of the support member 110. The layer 122 disposed on the bottom surface 114 of the support member 110 provides rigidity and generally increases the strength of the support member 110.

Fasteners 124 are disposed on the bottom surface 114 of the support member 110. The fasteners 124 are used to attach the support member 110 to the seat pan 130. The layer 122 provides for more positive fixation of the fasteners 124 to the support member 10 and also adds rigidity to the support member 10. The fasteners are preferably formed of a material that is resiliently deformable.

Apertures 132 are disposed in the seat pan 130 for receiving and retaining the fasteners 124 of the support member 110. The resiliently deformable fasteners 124 are preferably capable of being deformed to allow insertion of the fasteners 124 into the aperture 132 and then capable of re-expansion following the insertion into the aperture 132 to lockingly engage and retain the fasteners 124 into the apertures 132.

An occupant support 134 is disposed in a recess 135 of the seat pan 130 for cushioning support of an occupant. The occupant support 134 is superimposedly disposed beneath the opening 120 in the support member 110. The cushioning support 134 comprises a flexible woven sheet suspended across the recess 135 by rings or hooks 136 and provides a soft support for the occupant.

During assembly of the seat bottom assembly 100, the upholstered layer 102 and foam scrim layer 104 are stapled or otherwise affixed to the bottom surface 114 of the support member 110. The pad 128 is thereby sandwiched between the scrim layer 104 and the support member 110. Hence, when the support member 110 is mounted onto the seat pan 130, the upholstered layer 102, foam scrim layer 104, pad 128, and support member 110 are all mounted as a single unitary unit.

Figure 11:
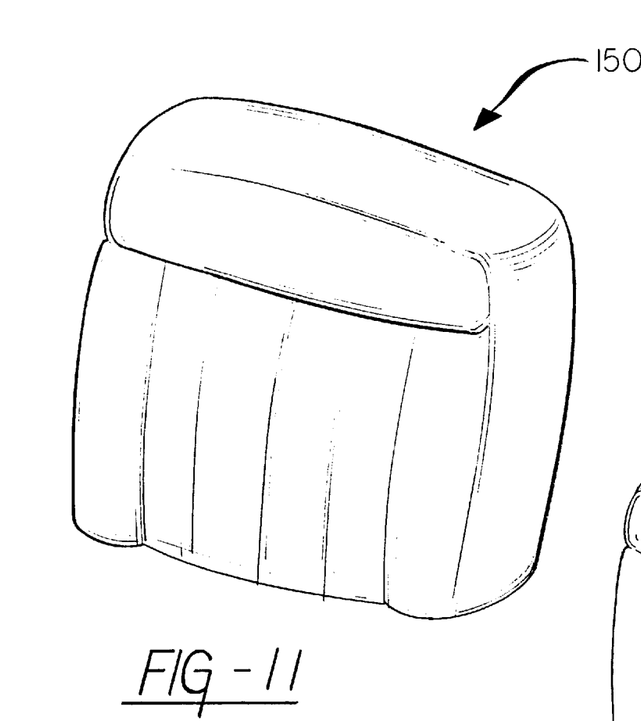
FIG. 11 is a perspective view of a seat back assembly of the subject invention.
Figure 12:
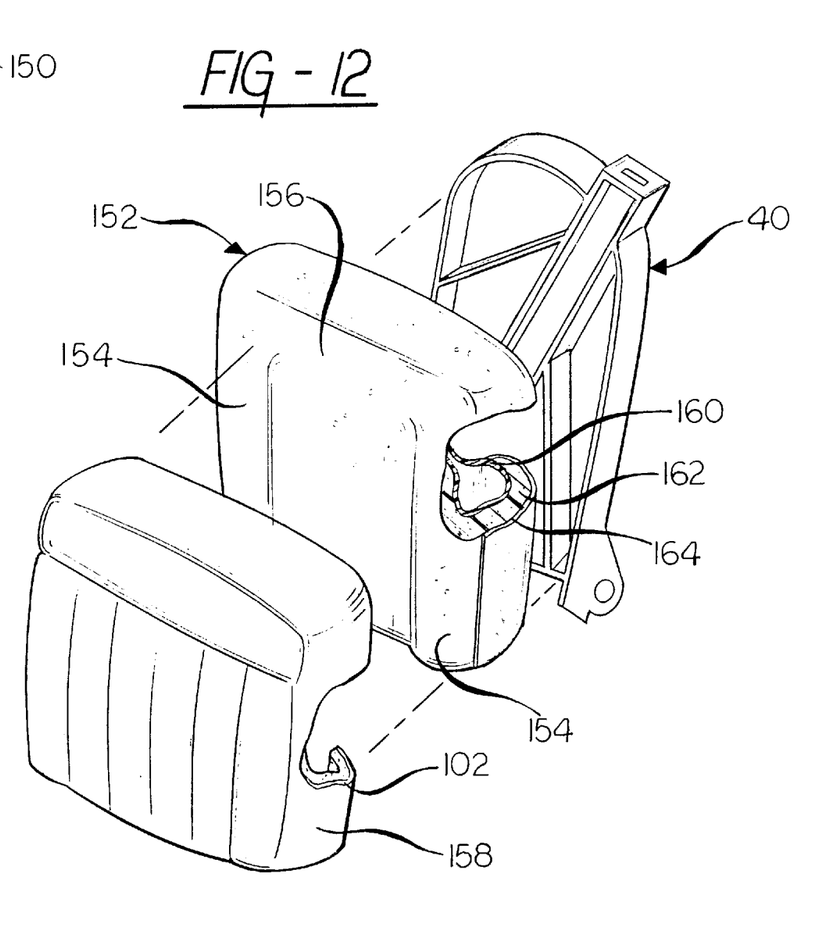
FIG. 12 is an exploded perspective view, partially in cross-section, of the seat back assembly of the subject invention.
Figure 15:
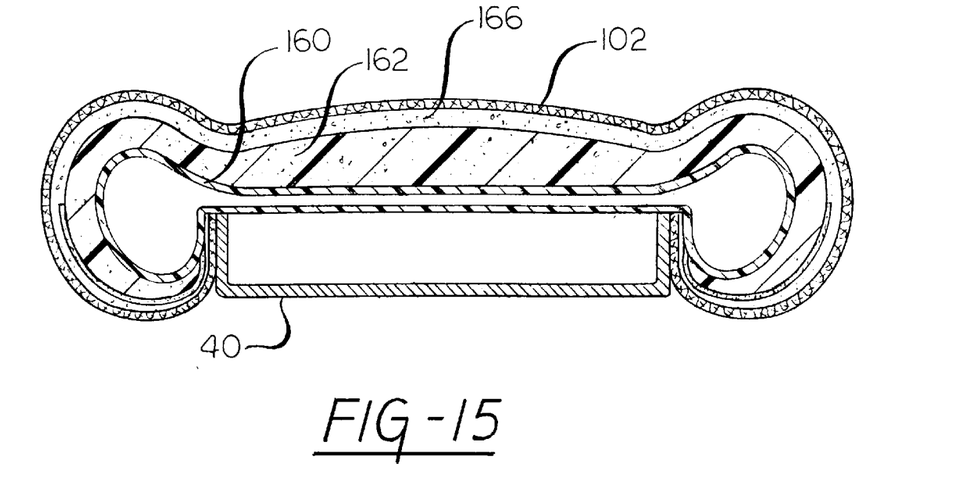
FIG. 15 is a cross-sectional view of the seat back of FIG. 12.

Referring to FIGS. 11, 12 and 15, a seat back is generally shown at 150. The seat assembly 150 includes a seat frame 40 secured to a support member 152 which is encapsulated by a trim cover 158. The support member 152 includes a pair of spaced apart upright bolsters 154 having upper and lower ends, and a cross member 156 interconnecting the bolsters 154.

The support member 152 is constructed of a substantially rigid inner layer 160 having a polymer layer 162 disposed thereover. The rigid inner layer 160 is preferably constructed of a polymeric material, such as polyethylene and the like. The polymer layer 162 is preferably constructed of an expanded foam material, such as polyurethane and the like. For aesthetic purposes, an outer layer 164 may be disposed about the polymer layer 162 in instances when the polymer layer 162 is exposed. The outer layer 164 can be constructed of any suitable elastomeric material, such as unexpanded polyurethane and the like.

The rigid inner layer 160 provides increased structural strength to the support member 152. The increased structural strength eliminates the deformation problem set forth above in the background section for prior art modular seat constructs. That is, by utilizing a support member 152 which includes an integral structural layer 160, the seat back assembly 150 can be constructed such that there is little or no deformation of the assembly 150 at points spaced away from and/or unsupported by the seat frame 40.

Figure 13:
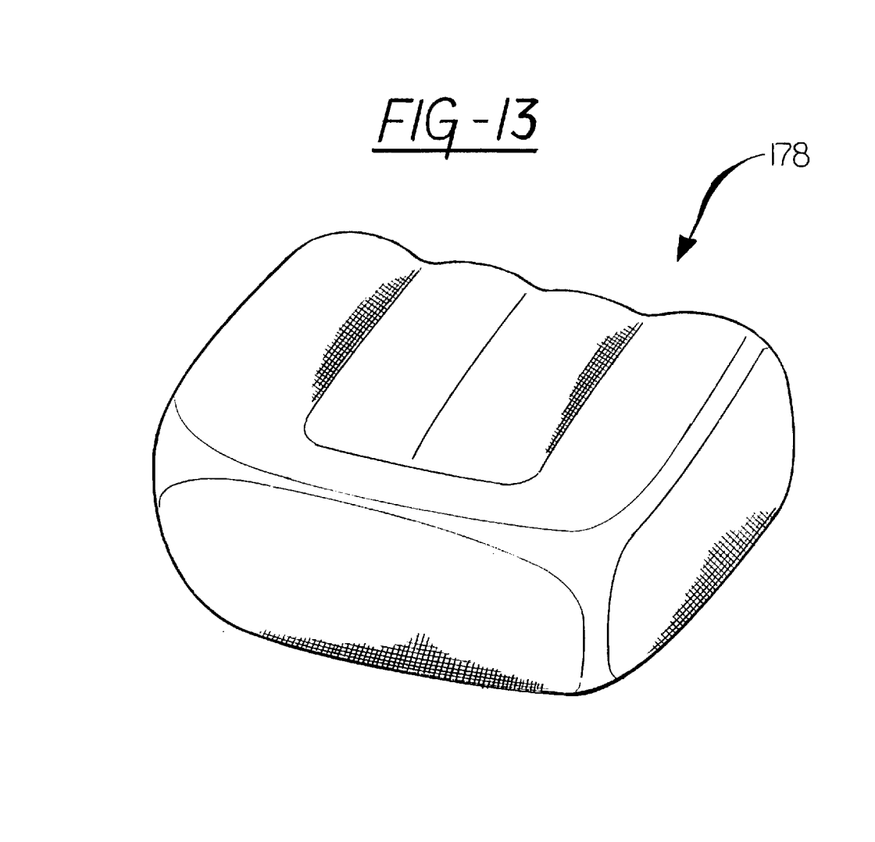
FIG. 13 is a perspective view of a seat bottom assembly of the subject invention.
Figure 14:
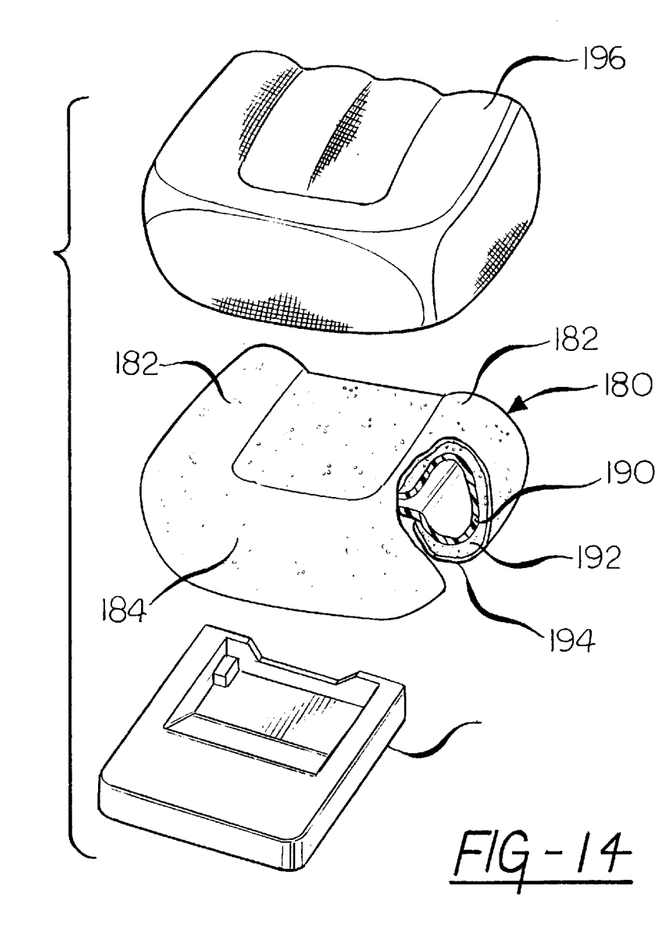
FIG. 14 is an exploded perspective view, partially in cross-section, of the scat bottom assembly of the subject invention.

Referring to FIGS. 13 and 14, a vehicle seat bottom assembly is generally shown at 178. The vehicle seat bottom assembly 178 includes a support member 180 which is structurally similar to the seat back support member 152 described above. The seat bottom support member 180 is encapsulated by a trim cover 196 and is supported and secured to a seat pan 130 which is attached to a seat frame 40. The scat bottom support member 180 can include a pair of spaced apart bolsters 182 having front and back ends and a cross member 184 interconnecting the bolsters 182. The seat bottom support member 180 is comprised of a rigid inner layer 190 having an expanded polymeric layer 192 disposed thereover. An elastomeric outer layer 194 is exposed about the expanded polymer layer 192. The materials which comprise the layers of the seat bottom support member 180 are the same as described above for the seat back support member.

Figure 16:
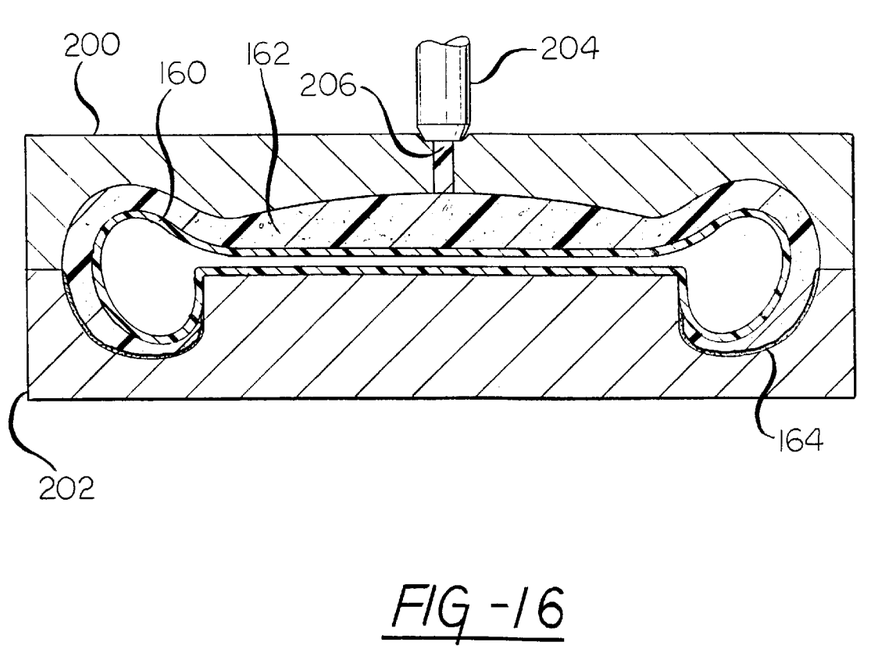
FIG. 16 is a cross-sectional view of a mold illustrating the method of making the seat bottom or seat back of the subject invention.

FIGS. 15 and 16 illustrate a method for making the seat back assembly 150 and/or the seat bottom assembly 178. The method includes the steps of forming the rigid inner layer 160, preferably by using a blow molding technique. Next, the rigid inner layer is positioned on one of the mold halves 200, 202. The other one of the mold halves 200, 202 is then placed over the rigid inner layer 160 to close the mold halves 200, 202. A molten parison of a polymeric material forming the polymer layer 162 is injected into the closed mold halves 200, 202 by extruding the molten parison through an extrusion nozzle 204 which enters the mold halves 200, 202 through an inlet 206. Optionally, the outer layer 164, preferably made of elastomeric material, may be sprayed into one of the mold halves 200, 202 prior to extruding the molten parison for aesthetic purposes. The polymer layer 162 is then cooled and becomes rigid, thereby forming the seat back assembly 150 and/or the seat bottom assembly 178.

After cooling, the rigid inner layer 160 and the polymer layer 162 can be removed from the mold halves 200, 202. A layer 166 of padding material may then be disposed over the polymer layer 162 to provide additional comfort for the occupant. The upholstered layer 102 may then be disposed over the padding layer 166 to provide a protective and aesthetically appealing appearance to the seat back assembly 150 and/or the seat bottom assembly 178. After the padding layer 166 and upholstered layer 102 are disposed over the polymer layer 162, the structure may then be positioned over the seat frame 40.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly, comprising:
   a support member including a back member and at least one bolster integrally formed with the back member; and
   a hinge portion disposed between the back member and the at least one bolster and integrally formed with the back member and the at least one bolster, said hinge portion is defined by a pair of spaced apart walls on a back surface of said support member said pair of spaced apart walls defining a channel therebetween,
   wherein the at least one bolster is pivotable about said hinge portion.

2. An assembly as set forth in claim 1 further including a bladder disposed in said channel for moving the at least one bolster relative to the back member.

3. An assembly as set forth in claim 1 further including a plurality of ribs disposed between one of said pair of spaced apart walls and the at least one bolster.

4. An assembly as set forth in claim 1, wherein said pair of spaced apart walls are discontinuously disposed on the back surface of said support member.

5. An assembly as set forth in claim 1 further including a bellow disposed above the at least one bolster for allowing movement of the at least one bolster relative to the back member.

6. An assembly as set forth in claim 1 further including a trim cover disposed over said support member.

7. An assembly as set forth in claim 6 further including at least one bladder disposed between said support member and said trim cover for extending and contracting said trim cover relative to said support member.

8. An assembly as set forth in claim 6, wherein support member includes hooks for receiving and retaining an attachment member affixed to said trim cover to attach said trim cover to said support member.

9. An assembly as set forth in claim 1 further including a seat back portion having upright members.

10. An assembly as set forth in claim 9, wherein said seat back portion include female fasteners for receiving and retaining male fasteners disposed on said support member.

11. An assembly as set forth in claim 10, wherein said male fasteners include resilient detents, said female fasteners include apertures disposed in said upright members, said apertures lockingly retaining said detents therein.

12. A vehicle seat assembly, comprising:
    a seat frame;
    a seat pan supporting said seat frame;
    a resilient contoured support member supported by said seat pan having top and bottom surfaces and including two sides extending for and aft and being laterally spaced apart from one another, a cross beam interconnecting said sides, said sides and said cross beam defining an opening therebetween for exposing a portion of said seat pan;
    a seat bottom trim cover disposed about said support member;
    a pad comprising an expanded material disposed between said seat bottom trim cover and said support member; and
    said bottom surface of said support member includes a layer of material disposed thereon.

13. An assembly as set forth in claim 12, wherein said support member is constructed of expanded polypropylene.

14. An assembly as set forth in claim 12, wherein at least one fastener is disposed on the bottom surface of said support member.

15. An assembly as set forth in claim 14, wherein said seat pan includes at least one receiver for receiving and retaining said at least one fastener disposed on said bottom surface of said support member.

16. An assembly as set forth in claim 15, wherein said receiver is an aperture.

17. An assembly as set forth in claim 14, wherein said at least one fastener is resiliently deformable, said resiliently deformable fastener being capable of being deformed to allow insertion of said fastener into said aperture and capable of re-expansion following insertion into said aperture whereby said fastener becomes lockingly engaged within said aperture.

18. An assembly as set forth in claim 12, wherein said expanded material has uniform thickness.

19. An assembly as set forth in claim 12 further including a cushioning support disposed in said opening between said pad and said seat pan.

20. An assembly as set forth in claim 19, wherein said cushioning support includes a flexible sheet suspended across said opening.

21. A vehicle seat assembly, comprising:

a seat frame; and a support member secured to said seat frame and encapsulated by a trim cover, said support member having front and back surfaces, a pair of spaced apart bolsters and a cross member interconnecting said bolsters, said support member comprised of a rigid inner layer, a polymer layer disposed thereover, and an elastomeric outer layer disposed about said polymer layer.

22. A vehicle seat assembly, comprising:

a support member including a back member and at least one bolster integrally formed with the back member;

a hinge portion disposed between the back member and the at least one bolster and integrally formed with the back member and the at least one bolster, the at least one bolster being pivotable about said hinge portion; and a bellow disposed above the at least one bolster for allowing movement of the at least one bolster relative to the back member.

* * * * *